3,642,818
FREE RADICALS
André Rassat and René Ramasseul, Grenoble, France, assignors to Commissariat a l'Energie Atomique, Paris, France
No Drawing. Filed Mar. 26, 1969, Ser. No. 810,794
Claims priority, application France, Apr. 4, 1968, 146,947
Int. Cl. C07d 27/26
U.S. Cl. 260—326.3     5 Claims

ABSTRACT OF THE DISCLOSURE

New free radicals having the formula:

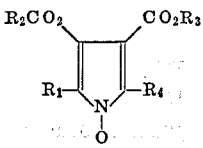

in which $R_1$, $R_2$, $R_3$ and $R_4$ are $C_1$–$C_4$ alkyl radicals (methyl, ethyl, n-propyl, iso-propyl, n-butyl, iso-butyl, and tertbutyl) may be prepared from an alkyl alkanoyl-acetate. The alkanoylacetate is dimerized or reacted with another alkyl alkoylacetate to give dialkyl ($\alpha,\beta$-dialkanoyl) succinate which, after cyclisation with hydroxylamine gives 1-hydroxy-2,5-dialkyl-3,4-di (alkoxycarbonyl) pyrrole which is oxidised to 1-oxyl-2,5-dialkyl-3,4-di (alkoxycarbonyl) pyrrole among the radicals of the above group, 1-oxyl-2,5-diterbutyl-3,4-diethoxycarbonyl pyrrole is particularly suitable for use in nuclear magnetic reasonance magnetometry.

---

The invention relates to novel stable free radicals of the nitroxide-type for use inter alia in magnetometry.

The free radicals according to the invention can couple their non-paired electron with the nuclei, inter alia the protons, of a solvent so as to bring about polarisation, i.e. so that the spins or kinetic moments of the nuclei are all arranged in the same direction. The radicals have the following properties which serve this purpose: good chemical stability, high solubility in a hydrogenated solvent, and the following magnetic properties: hyperfine deviation, i.e. a sufficiently high resonance frequency in a zero field, the polarisation of the protons being proportional to the hyperfine deviation; a hyperfine spectrum structure compatible with efficient saturation of the useful line for electronic resonance; and dipolar coupling between the spins of non-paired electrons and the spins of the protons in the solvent.

In addition to these properties, the free radicals of the invention have an advantage over known free radicals in that they provide a frequency for magnetometry which is markedly different for electronic resonance from that provided by the known radicals, and the spectrum lines are very fine.

The free radicals of the invention can be used as an inhibitor of radical polymerisation, a monomer stabiliser, an anti-oxidising agent, a photo-stabiliser and a spin marker in biological molecules.

The novel free nitroxide radicals according to the invention are characterised in that they are 1-oxyl-2,5-dialkyl-3,4-di(alkoxycarboxyl) pyrrols having the formula:

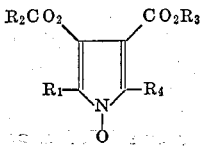

in which $R_1$, $R_2$, $R_3$ and $R_4$ are $C_1$–$C_4$ alkyl radicals (methyl, ethyl, n-propyl, iso-propyl, n-butyl, iso-butyl, and tertbutyl) which can be the same or different.

The free radicals of the invention may be prepared from an alkyl alkanoylacetate which is dimerized or reacted with another alkyl alkanoylacetate to give dialkyl ($\alpha,\beta$-dialkanoyl) succinate which, after cyclisation with hydroxylamine gives 1-hydroxy-2,5-dialkyl-3,4-di(alkoxycarbonyl) pyrrole which is oxidised to 1-oxyl-2,5-dialkyl-3,4-di(alkoxycarbonyl) pyrrole.

Thus, 1-oxyl-2,5-ditertbutyl-3,4-di(ethoxycarbonyl) pyrrole may be prepared from ethyl pivaloylacetate by dimerization to form ethyl ($\alpha,\beta$ dipivaloyl) succinate which is cyclised with hydroxylamine and heated to give 1-hydroxy-2,5- ditertbutyl-3,4-di(ethoxycarbonyl) pyrrole, which is oxidised to form the stable free radical already mentioned.

1-oxyl-2,5-diitertbutyl-3,4-di(ethoxycarbonyl) pyrrole is a stable radical which has the property of resonance frequencies independent of the solvent in which it is dissolved.

In a preferred embodiment, the dimerization of the alkyl alkanoylacetate or reaction thereof with a second alkyl alkanoylacetate is effected by the presence of sodium and subsequently the dropwise addition with stirring of iodine in an organic solvent, which solvent advantageously is ether. Cyclisation in this embodiment is brought about by the action on a solution of hydroxylamine hydrochloride and sodium acetate, with heating and stirring for a number of days. Oxidation in this embodiment is brought about by vigorous stirring in an organic solvent such as benzene or methylene chloride for 15 minutes in the presence of lead dioxide.

We shall now describe an exemplary embodiment of the method of preparing 1-oxyl-2,5-ditertbutyl-3,4-di (ethoxycarbonyl) pyrrole.

The first stage of the method consists in preparing diethyl ($\alpha,\beta$ dipivaloyl) succinate, which has the following chemical formula:

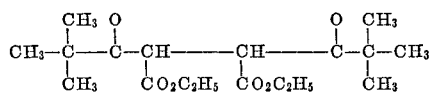

The starting substance was 37.0 g. ethyl pivaloylacetate (90% pure), corresponding to 32.2 g. or 0.2 mol, which was dissolved in 30 ml. ether and added dropwise with stirring over a period of 6 hours to 4.6 g. (0.2 gram-atom) of sodium cut into small pieces and suspended in 70 ml. ether. Stirring was continued for 3 hours, after which a solution of 20 g. iodine (0.1575 gram-atom) in 150 ml. ether was added dropwise and with vigorous stirring over a period of 15 minutes. 500 ml. water was added to the resultant mixture, which was then extracted with ether (3× 400 ml.). The ethereal fractions were washed with water (400 ml.) and with a saturated solution of sodium chloride (400 ml.). The fractions were dried over anhydrous sodium sulphate after which the ether solvent was expelled in vacuo, by heating over a water bath.

34.9 g. of crude product were obtained, containing 60% of diethyl ($\alpha,\beta$ dipivaloyl) succinate (isomer $\alpha$=95%, isomer $\beta$=5%), 30% of ethyl pivaloylacetate which had not reacted, and 4% of impurities.

This crude product was filtered onto 400 g. silica and 16.5 g. of diethyl ($\alpha,\beta$ dipivaloyl) succinate, a 50% yield, was washed out with a mixture of 95% petroleum ether and 5% diethyl ether. The first fractions eluted were richer in isomer $\beta$ than the original mixture, whereas the last fractions eluted contained 97% of isomer $\alpha$ and 3% of isomer $\beta$.

The product was identified by infra-red and ultra-violet analysis and analysis of the nuclear magnetic resonance. Ultra-violet analysis in the pure liquid containing 97% of isomer α gave an absorption $\gamma C=O$ at 1710 cm.$^{-1}$ and absorption $\gamma-O-C=O$ at 1735 cm.$^{-1}$; ultra-violet analysis of the substance containing 97% α and 3% β gives the following results.

In cyclohexane:
$\lambda_{max.}=287$ mμ, $\epsilon=110$
$\lambda_{max.}=290$ mμ, $\epsilon=110$ In methanol:
$\lambda_{max.}=284$ mμ, $\epsilon=109$ ε being the coefficient of molecular extinction.

The second stage of the method consists in preparing 1-hydroxy-2,5-ditertbutyl - 3,4 - diethoxycarbonyl pyrrole, having the following chemical formula:

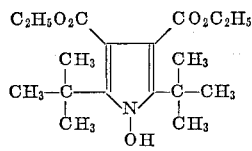

A solution of 3 g. hydroxylamine hydrochloride (4.32.10$^{-2}$ mol) and 6 g. sodium acetate (4.32.10$^{-2}$ mol) in 42 ml. water was added to 10.14 g. diethyl (α,β dipivaloyl) succinate (97% pure or 2.88.10$^{-2}$ mol containing 92.5% isomer α and 7.5% isomer β) dissolved in 100 ml. acetic acid. The mixture was magnetically stirred and heated by an oil bath to 50–60° C. for 13 days. At the end of this period, the solution was neutralised by adding 180 g. sodium bicarbonate in suspension in 1 litre water. The resultant solution was extracted with ether (3× 500 ml.) and the ethereal fractions were washed with water (500 ml.) and with a saturated sodium chloride solution (400 ml.) and dried over anhydrous sodium sulphate. After driving off the ether solvent in vacuo on a hot water bath, 7.8 g. of liquid product were obtained and filtered on 120 g. silica.

6.2 g. of 94% pure diethyl (α,β dipivaloyl) succinate— a 59% yield—was eluted with 95% petroleum ether and 5% diethyl ether, and further elution with 50% petroleum ether and 50% diethyl ether gave 1.1 g. of white product divided into five relatively viscous fractions. 18 ml. petroleum ether was added to the fractions, and the part insoluble in petroleum ether was recovered by filtration, giving 0.658 g. of 1-hydroxy-2,5-ditertbutyl-3,4-di (ethoxycarbonyl) pyrrole.

The product, after being recrystallised from a mixture of petroleum ether and benzene, had a melting point of 173° C. The infra-red spectrum in Nujol was as follows:

$\gamma OH$ 3180 cm.$^{-1}$; $\gamma C=O$ 1720 and 1680 cm.$^{-1}$ and the ultra-violet spectrum in methanol was as follows:

$\lambda_{max.}=254$ mμ, $\epsilon_{max.}=5200$
$\lambda_{max.}=204$ mμ, $\epsilon_{max.}=16000$ The third stage of the method consists in preparing 1-oxyl-2,5-ditertbutyl-3,4-diethoxycarbonyl pyrrole, which has the following chemical formula:

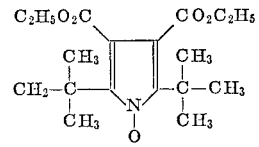

0.510 g. of 1 - hydroxy - 2,5 - ditertbutyl - 3,4 - di (ethoxycarbonyl) pyrrole (1.51.10$^{-3}$ mol) were dissolved in 200 ml. benzene and the solution obtained was vigorously stirred in the presence of 3.8 g. lead dioxide (151.10$^{-3}$ mol) for 15 minutes. After this time, the mixture was filtered over sintered glass and the benzene solvent was driven off in vacuo over a hot water bath. 0.500 g. of a blue-green product was obtained.

The product was eluted chromatographically on 30 grams of silica, first with 95% petroleum ether and 5% diethyl ether, giving 0.347 g. of 1-oxyl-2,5-ditertbutyl-3,4-di(ethoxycarbonyl) pyrrole, a 66% yield, then with 50% petroleum ether and 50% diethyl ether giving 0.10 g. of product melting at 170° C. (starting product residue).

The melting point of the free radical obtained was 70° C.

Infra-red spectrum in Nujol:

$\gamma C=O$ at 1730 cm.$^{-1}$, $\gamma C=C$ at 1560 cm.$^{-1}$

Ultra-violet spectrum in cyclohexane:

$\lambda_{max.}=795$ mμ, $\epsilon=31$
$\lambda_{max.}=377$ mμ, $\epsilon=2900$
$\lambda_{max.}=262$ mμ, $\epsilon=5250$ Shoulder at:

$\lambda_{max.}=215$ mμ, $\epsilon=10200$
$\lambda_{max.}=198$ mμ, $\epsilon=13350$ Electronic paramagnetic resonance:

In solid:

Capillary tube sealed in vacuo
Paramagnetism equal (to within ±20%) to that of a sample of 1-oxyl-2,2,5,5-tetramethyl-1-aza-3-cyclopentene carboxamide
ΔH (width of line halfway up)=2.5 oe.±0.1 g. (Landé factor)=2.0063
$\gamma N=14,446.601$
$H_0=3,393.130$ oe.

In solution:

Benzene (at M/1000) 3$a_N$ lines=4.57 oe.

ΔH (width of line halfway up) 0.125–0.150 oe.

The product is unstable in methanol.

In addition to the three products obtained during the stages of the method hereinbefore described, the most important product being the stable free radical derived from pyrrole for use in magnetometry, the method can be used with diethyl (α,β-dipivaloyl) succinate to prepare 2,5-ditertbutyl-3,4-diethoxycarbonyl-pyrrole whose chemical formula is:

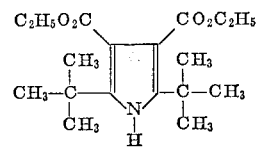

The method is as follows:

1.21 g. diethyl (α,β-dipivaloyl) succinate (91%α and 9%β) (3.5 millimols) were dissolved with 0.545 g. (7.08 millimols) of ammonium acetate in 3.5 ml. acetic acid and the mixture heated at reflux for 24 hours. The acetic solution was neutralised with 150 ml. of potassium carbonate solution and then extracted with ether (3×150 ml.). The ethereal fractions were washed with water (150 ml.) and with saturated sodium chloride solution (150 ml.), and then dried over anhydrous sodium sulphate. The ether solvent was driven off in vacuo over a hot water bath, giving 1.065 g. of a product consisting of a mixture of 2,5-ditertbutyl-3,4-di(ethoxycarbonyl)pyrrole and diethyl (α,β-dipivaloyl) succinate (65α and 35β) which had not reacted.

The crude product was eluted by chromatography on 100 grams silica gel, first with 90% petroleum ether and 10% diethyl ether, to give 245 mg. of diethyl (α,β-dipivaloyl) succinate, then with 90% petroleum ether and 10% diethyl ether and with 80% petroleum ether and 20% diethyl ether to give 0.765 g. of 2,5-ditertbutyl-3,4- di(ethoxycarbonyl)pyrrole. The melting point was 93° C. and the yield was 67%.

Infra-red spectrum (suspension in Nujol):

3430 cm.$^{-1}$ ($\gamma$NH), 1720, 1690 ($\gamma$C=O), 1565 ($\gamma$C=C)

Ultra-violet spectrum in cyclohexane $\lambda_{max.}=259$ m$\mu$, $\epsilon_{max.}=6000$
$\lambda_{max.}=200$ m$\mu$, $\epsilon_{max.}=22000$

We claim:
1. A free radical having the general formula

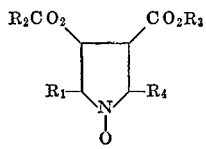

wherein $R_1$ and $R_4$ are tertiary butyl radicals, and $R_2$ and $R_3$ are identical or different $C_1$–$C_4$ alkyl radicals.

2. A free radical according to claim 1, consisting of 1-oxyl-2,5-ditertiary butyl-3,4-diethoxycarbonyl pyrrole.

3. A method of preparing a free radical, consisting essentially of bringing an alkyl alkanoylacetate in contact with sodium, adding thereto and iodine solution in an organic solvent and causing said alkyl alkanoylacetate to react with a second alkyl alkanoylacetate so as to obtain a dimerization product consisting essentially of the $\alpha,\beta$ alkyl dialkanoylsuccinate, heating and stirring said $\alpha,\beta$ alkyl dialkanoylsuccinate in the presence of a solution of hydroxylamine hydrochloride and sodium acetate to obtain a cyclization product consisting essentially of 1-hydroxy-2,5-dialkyl-3,4-dialkoxycarbonyl pyrrole, and stirring said 1-hydroxy-2,5-dialkyl-3,4-dialkoxycarbonyl pyrrole in an organic solvent in the presence of lead dioxide to obtain an oxidation product consisting of 1-oxyl-2,5-ditertiary butyl-3,4-diethoxycarbonyl pyrrole.

4. A method as claimed in claim 3 wherein the organic solvent is benzene or methylene chloride.

5. A method of preparing a free radical as claimed in claim 1 comprising oxidizing the corresponding 1-hydroxy-2,5-dialkyl-3,4-di(alkoxycarbonyl)pyrrole with lead oxide.

References Cited

UNITED STATES PATENTS 3,502,692    3/1970    Feldman et al. _____ 260—326.3

ALEX MAZEL, Primary Examiner

J. A. NARCAVAGE, Assistant Examiner

U.S. Cl. X.R.

252—401, 408; 260—483